MAGNETIC TAPE TRANSDUCING CONTROL SYSTEM

Filed Nov. 12, 1964 2 Sheets-Sheet 1

INVENTORS:
Paul Niquette
Ben C. Wang
Martyn A. Lewis
By Smyth, Roston & Pavitt
Attorneys INVENTORS:
Paul Niquette
Ben C. Wang
Martyn A. Lewis
By Smyth, Roston & Pavitt
Attorneys United States Patent Office 3,412,385

Patented Nov. 19, 1968

3,412,385
MAGNETIC TAPE TRANSDUCING CONTROL SYSTEM

Ben C. Wang, Los Angeles, Paul Niquette, Palos Verdes Estates, and Martyn A. Lewis, Culver City, Calif., assignors to Scientific Data Systems, Inc., Santa Monica, Calif., a corporation of Delaware Filed Nov. 12, 1964, Ser. No. 410,591
10 Claims. (Cl. 340—174.1)

ABSTRACT OF THE DISCLOSURE

A digital, magnetic tape recorder is provided with a capstan clock to clock the recording of digital information independent from speed variations for constant bit densities on the tape. The clock pulses are counted for metering a gap in between recording of two records. The capstan is controlled by a motor having a high torque to inertia ratio and in accordance with an asymmetrical start-stop characteristic. The capstan clock, for example, can be a digital tachometer disk or a tachometer generator driving a VCO.

Figure 1:
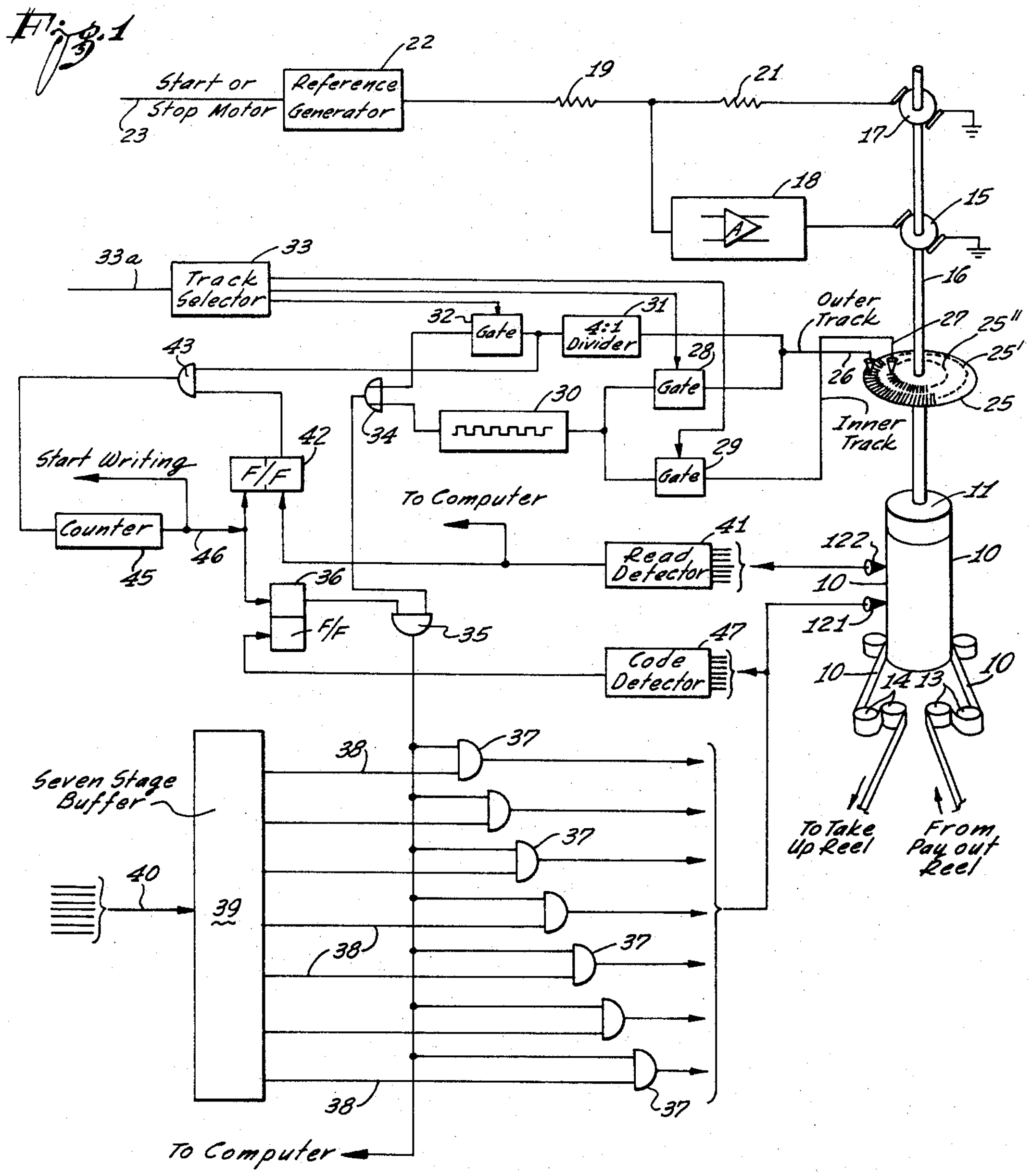

The present invention relates to improvements in systems for magnetic tape recordings and reproducings.

For magnetic recordings of digital data, it is very important to write sequences of digital data on the tape at a very accurately constant density of bits. Normal densities are, for example, 556 or 800 bits per inch of tape. Such sequences of data form records written on the tape and/or read from the tape during one phase of operation. Unless more than one of such records are written on the tape during one phase of operation, the tape drive should be stopped as soon as the last character of a record has been written. For any subsequent recordings, the tape has to be started anew.

It is obvious that the tape cannot be stopped nor attain full speed instantaneously. Therefore, there will and must be an information gap on the tape in between two records. One determining factor for the length of the gap is that from the end of a record on the tape up to the relative position of writing head when the tape has stopped, no new characters should appear within the detecting range of this magnetic transducer reading the tape.

For computer compatibility of such recording device, it is necessary that the so-called read-after-write principle be employed. Any character written on the tape is read again from the tape for verification of correct recording. Hence, a magnetic reading transducing head is placed relative to the magnetic write transducing head permitting the reading from the tape of what has just been written thereon. At the end of a record, the tape should not be stopped, until this end has passed the read head. Accordingly, a tape portion equal to the distance between write and read heads will have passed unused under the write head until subsequent to the reading of the end of the record, the tape is being stopped. Thus, the gap in between two records will have at least the length of the distance between read and write heads.

Further considerations are that the bit and character density or the tape should be as constant as possible. Irregular bit densities impede character recognition during readout. Known methods, therefore render the writing of characters dependent upon the tape speed and particularly the writing of a record is not started until the tape has attained regular speed.

Hence, the gap in between two records will be equal to the distance between read and write heads, plus the normal distance a tape travels in between issuance of a stop command and actual stopping of the tape, plus the distance travelled by the tape after restarting until regular speed has been attained within a range of permissible tolerances. This gap length is neither constant nor small in comparison with the length of normal records. The gaps form a sizable portion on a tape and reduce drastically the space available for recording on a given length of tape. When the device operates to search for a particular record, the searching time is increased with the total amount of gaps on the tape, and the periods of time during which gaps pass the reading head form a totally lost delay.

It is an object of the present invention to provide for a control system for magnetic tape recordings, permitting reduction of gaps and rendering the bit density written on a tape independent from the tape speed variations during recording.

It is a principal feature of the invention to meter the gap between two records on a magnetic tape independent from the tape transport speed. Means are provided to cause commencement of writing on the tape in strict dependence upon the distance of the writing head from the end of the record previously written, and subsequent writing of character bits on the tape is controlled by the passage of fixed increments of tape.

A positive i.e., slippage free coupling is provided between the tape and a capstan transporting tape. This slippage free engagement is insured by appropriately tensioning the tape so that the phase angle of rotation of the capstan is a representative value for the tape position. The phase angle progresses with the tape. The capstan shaft is equipped with a phase indicator, for example, a disc bearing reference markers. The disc is monitored at a stationary point, and a train of pulses is produced indicating phase and speed of capstan and tape. Alternatively, the capstan shaft may be coupled to a D.C. tachometer controlling a voltage controlled oscillator. The oscillations produced vary in frequency corresponding to tape speed variations.

If the pulses or oscillations thus produced are, for example, counted, exact distances of tape travel can be metered. The commencement of writing is made dependent upon a particular counting result, so that the gap can be metered accurately and independently from tape speed variations and independently from any indefinite periods of time tape stopping in between two writing operations. Furthermore, if the same capstan phase indicator is used to control the writing of each bit on the tape, the tape speed variations will not vary the bit density of the tape, and writing may thus commence before normal tape speed is attained. For reasons of operating the tape reading at optimum and constant signal levels, the tape drive should impart a highly constant speed motion upon the tape, and accurately defined to stop and start characteristics are desired to improve response times. These provisions enhance the possibilities of recording regardless of whether or not the tape runs at normal speed and the recording process can thus be decoupled functionally from any speed error signal processing controlling the tape drive.

Figure 3:
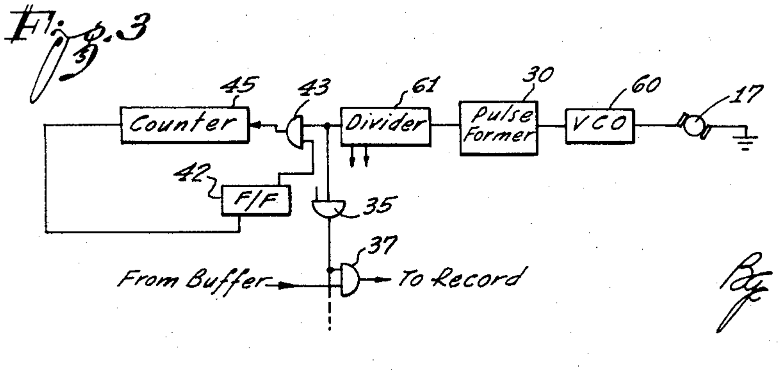
Figure 2:
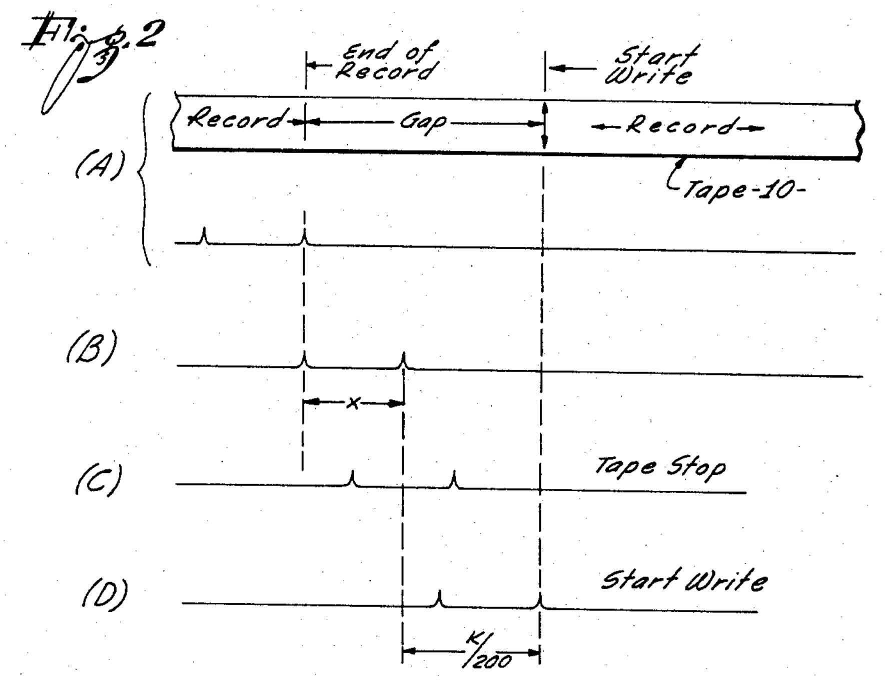
Figure 4:
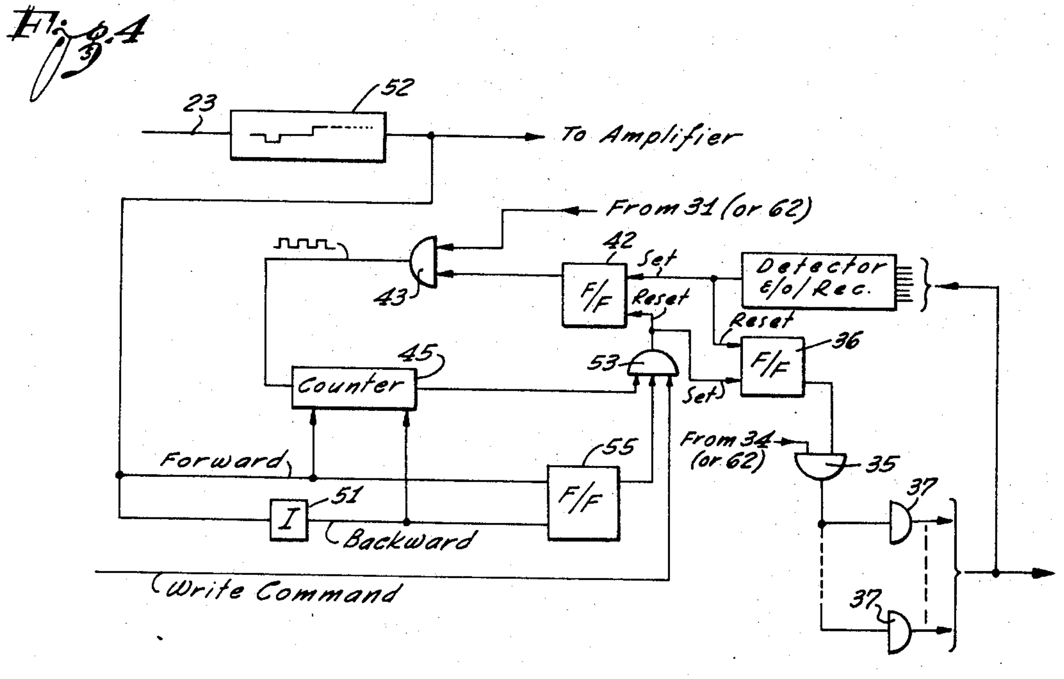

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawing, in which:

FIGURE 1 illustrates a block diagram of a preferred embodiment of the invention;

FIGURE 2A, composite of A–D, illustrates a sequence of relative portions between a magnetic tape and a magnetic transducer head assembly; and FIGURES 3 and 4 illustrate modifications of the circuit shown in FIGURE 1.

Proceeding now to the detailed description of the drawing and particularly FIGURE 1 thereof, there is shown a magnetic tape 10 driven by a capstan 11 past a read-write head assembly comprised of a writer transducer head assembly 121 and of a read transducer head assembly 122 mounted together so that the read and write gaps are apart by a distance X measured along the direction of tape transport. Read and write head assemblies are capable of respectively reading and writing seven parallel tracks on the tape.

The tape 10 is wrapped around the capstan 11 over an angular range of approximately 180° to provide a large area of frictionally adhering contact between the tape and the mantle surface of the capstan. The capstan surface may be comprised of rubber or the like to provide sufficient frictional contact with the tape, so that the tape 10 will not slip during rotation of the capstan 11, particularly during acceleration thereof.

The tape 10 is fed towards the capstan from a supply or pay out reel (not shown) passing, for example, over tension adjusting rollers 13 or the like serving to provide sufficient tension for the tape, just in excess of the level sufficient to prevent slippage between tape and capstan particularly during acceleration. Also, rollers 13 serve to decouple capstan and pay out reel. After passing the read-write head assembly 12 the tape is passed over another tensioning roller or roller system 14 and from there to the take-up reel (not shown).

The specific tensioning device as well as the supply and take-up reels are conventional and are not by themselves a part of the present invention. It is significant, however, that the tape moves past the read-write head assembly 12 at exactly the same speed as the linear speed of the capstan 11 which rotates in strict frequency and phase synchronism with the passage of tape past the read and write heads.

The capstan is driven by a direct current motor 15 which is of the type having a high torque to inertia ratio. As an example, this motor may have a planar rotor body having the windings disposed as printed circuit conductors thereon. This type of motor is preferred for the tape transport, becasue it has also a substantially linear torque vs. current characteristic over a relatively large range.

A driving shaft 16 is coupled to the rotor of motor 15 and supports directly the capstan 11. In particular, the coupling between shaft 16 and capstan 11 is to be of the type that no idling or dead angle of positioning occurs as between the shaft and capstan. The shaft 16 further supports a tachometer generator 17 providing a DC output voltage which is indicative of the speed of motor and capstan.

The motor 15 is connected electrically to the output side of a direct current amplifier 18. The amplifier 18 preferably is of the type having a very high gain, at least over an input and output current range which includes the current for normally driving the motor 15 outside of the acceleration or deceleration periods. The high gain range may extend into current ranges necessary for accelerating or decelerating of the motor. Alternatively, the amplifier 18 may have a saturation range for input currents higher than the current necessary to run motor 15 at normal speed. When operating in the saturation range amplifier 18 supplies a constant current to the motor 15, particularly during acceleration thereof.

The input circuit network of amplifier 18 is governed by a negative summing network comprising the two resistors 19 and 21 having a common junction which is the main input terminal of amplifier 18 aside from common ground. The resistor 21 is connected with its respective other side to the free terminal of the direct current generator-tachometer 17, and the voltage drop across resistor 21 is indicative of the rotational speed of motor and capstan.

The other side of the resistor 19 is connected to the output terminal of a network 22 destined to provide a suitable reference voltage for the direct current motor 15 and for the feedback loop established by the elements 17, 21 and 18. The network may, for example, be a function generator producing a reference voltage having a wave form as needed to drive the motor 15 in accordance with a particular program. The terminal 20, therefore receives an error signal as controlling input for amplifier 18.

To some extent, the output signal furnished by the reference voltage (or current) generator 22 depends upon the characteristics of the amplifier 18.

For example, amplifier 18 may be of the saturable type, so that for large input signals above a threshold value the amplifier output is constant current. A similar amplifier characteristic is attainable if for high motor currents and within a particular range of large error signals the amplifier output is regulated by an internal feedback loop to have constant current characteristics. In this case, the reference voltage as provided by network 22 may be a voltage block of constant value established and provided for the period of time during which motor 15 is required to run. Thus, network 22 may be two flip flops preferably provided with means to maintain the output voltage levels constant, one flip flop to be actuated to provide a positive reference voltage for forward transport, while the other flip flop provides a negative reference voltage for motor reversal.

The voltage generator 22 may be triggered by signals in a command line 23 connected to a computer issuing command signals that the motor 15 constituting the principal tape transport control element, is to be started, either in forward or in reverse whereupon the network 22 issues instantaneously a voltage block of particular polarity to drive the motor 15.

Assuming the amplifier 18 is either of the saturable type, or it is provided with an inner feedback loop to control the motor current during the acceleration period to a constant value, then upon issuance of a command signal in line 23, the reference voltage immediately established by network 22 is at that time not offset by any voltage as developed by the generator 17, since the motor is not running. Thus, the error signal applied to terminal 20 is the reference signal then effective, and this relatively high input at terminal 20, therefore, results in a current of predetermined value and fed to motor 15 starting the same. During most of the acceleration period, the motor speed is below the desired speed, and the voltage generated by tachometer 17 does not suffice to offset completely the reference voltage.

As long as the error signal is relatively large, the output of amplifier 18 is a constant current, and the motor develops a constant torque accordingly: When motor 15 has almost reached the desired speed, the voltage generated by tachometer 17 is sufficiently high to reduce the potential at terminal 20 to a value which places the amplifier 18 out of the constant current range and into the high gain and controlled range thereof for maintaining the motor speed at the desired value, as determined by the constant reference voltage supplied by the network 22 for the desired duration of tape driving; the error voltage developed at terminal 20 suffices to maintain the motor within the desired range of speed tolerances.

The relationship of amplifier 18 and reference voltage generator 22 may be a different one. For example, the amplifier may have no saturation characteristics, and for starting the reference voltage may be rising at a certain slope commensurate with the increasing output of tachometer 17. RC circuits in the network 22 may provide for such sloping of the reference voltage. Now the error signal at terminal 20 will increase at first, then remain constant for the main portion of the acceleration period, and after normal speed is approached sufficiently closely, the error signal will decrease to the normal value to cause the motor to run at normal speed. Since the error signal is constant during most of this acceleration, a constant torque is developed even though the amplifier does not saturate. Deviations from these starting conditions such as speed irregularities due to torque variations are reflected in variations of the error signal throughout the starting period. The error signal exercises full control over every phase of the motor movement and the amplifier output follows the error signal variations at all times to cause the motor to accelerate and to run at the desired characteristics. Since it is desirable to stop the tape fast when a stop command has been issued by the computer, the reference network 22 may, for stopping, temporarily produce a faster stop waveform (ramp) than was given for start. This will cause the motor to stop at a faster rate (in accordance with the faster stop ramp) than during starting. For example, one may use an acceleration of $1.0 \cdot 10^4$ i.p.s.$^2$ and a deceleration of $2.7 \cdot 10^4$ i.p.s.$^2$ for a motor having rated acceleration and deceleration of $1.5 \cdot 10^4$ i.p.s.$^2$ without overheating the motor.

The shaft 16 of the motor 15 supports a disk 25 comprised of transparent material, such as glass and bearing opaque reference markers or grating lines arranged in two concentric tracks 25′ and 25″ at very accurate spacing. Alternatively, a magnetized disc with permanent marker-magnetization can be used. The outer track 25′ may comprise of altogether N equidistantly spaced markers, whereas the inner track 25″ may comprise of M such reference markers. The numbers M and N are determined as follows:

For purposes of computer compatible recordings, three types of bit-rate frequencies are to be developed by this system. For these three different types of recordings it is required that exactly 800, 556 or 200 bits be placed on one inch of tape. The direct coupling of tape 10, capstan 11 and disk 25 enables the determination of the number of bits to be recorded upon the tape, by providing a corresponding number of markers on the disk 25. Due to the direct and positive coupling of tape 10, capstan 11 and disk 25, the passage of one inch of tape 10 at the read or write head 12 corresponds exactly to an angle $\phi$ of rotation of disk 25 serving as unity. The outer track 25′, therefore, has sufficient markers, that the rotation of disk 25 through angle $\phi$ results in the passage of 800 markers past an arbitrarily selected stationary monitoring point. Thus, $N=800 \cdot 2\pi/\phi$.

The inner track 25′ bears so many markers that during rotation through precisely the same angle $\phi$, 556 markers pass this arbitrarily selected stationary monitoring point. Thus, $M=556 \cdot 2\pi/\phi$. In case a bit density of 200 bits per inch is desired, the outer track can be used in conjunction with a frequency divider producing output pulses at a ratio of 1:4 of occurrence of input pulses.

The two tracks 25′ and 25″ are respectively monitored by stationary pickoff devices 26 and 27 which may be comprised of photoelectric detectors including, for example, preamplifiers and being of conventional design. If disk 25 stores the markers magnetically the pickoff devices will be transducers of the magnetic reading head type. The pickoff devices or reference marker detectors 26 and 27 produce electrical, sinusoidal signals during rotation of the disk 25, whereby phase and frequency of each wave train is an exact indication of position and speed of the tape.

The sinusoidal waves are respectively passed to gates 28 and 29. Only one of the gates is open for passage during any phase of operation, but both gates feed a common input terminal of a square wave generator 30 wherein the gated signals are being converted into a binary pulse train, still having frequency and phase exactly corresponding to frequency and phase of the reference markers of the particularly monitored track on disk 25 as they pass the stationary pickoff point.

It should be noted that the individual elements 26 to 30 as described and illustrated serve primarily as illustration of function. The principles involved require amplification of the picked up signals as resulting from monitoring the tracks of the disk; it is further required that such signal be converted to a train of binary signals or pulses, and the two signal trains must be gated so that only one at a time is effective. These requirements can be implemented in any desired manner and in any sequence. Also gating and amplification or gating and pulse converting can respectively be combined structurally. Any of the binary sequences produced is representative of the increments of tape as transported past the transducer heads.

It is significant for practicing the invention, that the frequency of the binary pulses is not of particular interest in terms of number of pulses per unit time. Such value is important only as far as the specific frequency transmission characteristics of the electrical circuit elements employed is concerned. More significant for the inventive system is a frequency measurement in terms of pulses or bits per unit tape length. It is the constance of this latter frequency that is important.

The output signals of the outer track are represented by the signal train furnished by pickoff device 26 and they are additionally fed to a 4:1 frequency divider 31 continuously producing a 200 bits-per-inch series of pulses. Preferably, the divider output signals may have the form of binaries. The output of divider 31 is fed to the signal input terminal of a third gate 32. The output signals of the two elements 30 and 32 are passed through an "or" gate 34.

It will be appreciated that at any time a train of pulses will appear at the output terminal of "or" gate 34. Such train may either be indicative of a desired writing speed of 800 bits per inch, or of a desired writing speed of 556 bits per inch, or a desired writing speed of 200 bits per inch.

A track selector stage 33 governs the gating terminals of gates 28, 29 and 32. The computer to which the unit is connected may issue a code signal into a line **33*a* whereupon stage 33** selectively activates a selected one of its three output lines respectively leading to the three gates.

The output pulses of "or" gate 34 regardless of origin serve as write clock pulses during normal writing operations, and they are passed to a gate or "and" circuit 35 receiving additionally a write command signal from the set side output of a flip-flop 36. The flip-flop 36 is being turned on in a manner to be described below.

The gated pulses appearing at the output side of "and" circuit 35 are passed to the gating terminal of seven "and" gates 37 as enabling signals.

It is presumed that seven tracks are being written on the tape which is conventional for computer operating with characters each being composed of seven bits. The above-mentioned density of 800 or 556 bits per inch tape actually is to be stated more accurately as being related to 800 to 556 characters per inch with each character comprised of at least one, at most seven bits written in parallel across the tape. Character and bit densities of interest are measured in the direction of tape extension and movement.

The gates 37 feed individual and parallelly disposed writing heads 121 of the read-write assembly 12. The signal input terminals of the gates 37 are connected to seven output channels 39 pertaining to a buffer 38 having seven command input lines 40 connected to the computer.

The writing of the seven bits in parallel on the tape is, therefore, clocked from pulses derived from the disk 25, whereby the particular density of the characters to be written along the tape 12 is being determined solely by the gating of either one of the gating elements 28, 29 or 32. Furthermore, writing is completely inhibited when the flip-flop 36 is being turned off, since gate 35 will then be blocked for inhibiting further write clocking.

Usually a plurality of characters form a record, and the end of the record may be identified by a particular character serving as end-of-record code. A detector 47 is connected to the seven output lines of gates 37 to respond to coincidence of the bit combination in the seven channels identifying this end-of-record code. Upon appearance of this code, detector 47 furnishes an output signal used to turn flip-flop 36 off. Thus, gate 35 is blocked after the end-of-record character has been transferred from the buffer 39 and written onto the tape 10. Alternatively, a write-stop command signal may be developed by the computer to turn off flip-flop 36.

In general, it is desirable that characters written onto the tape are immediately thereafter read from the tape for purposes of checking that the characters as written on the tape are correctly shown therein. This is called read-after-write. If this read-after-write method is employed, the read head 122 may be connected to a detector such as network 41 responding also to this particular end-of-record identifying code, but when it is read from the tape. This code detector 41 is similar to detector 47.

The output signal furnished by detector 41 upon reading this end-of-record code is, therefore, an indication that the read head has just passed over the end of the record, as previously written on the tape. A signal produced at that moment is also an indication that the write head has passed over a tape portion, which is exactly equal to the distance X between read and write head assemblies, particularly the spacing between read and write transducer gaps.

FIGURE 2A illustrates schematically the relative position of tape and transducer head assembly at the time of writing the end-of-record code, while FIGURE 2B illustrates the relative position of the same elements at the time of read-out of the end-of-record code.

The output signal of detector 41 is used to set a flip-flop 42. The output set side of flip-flop 42 is connected to the gating terminal of a gate 43 having its signal input terminal connected to the output terminal of the 4:1 divider stage 31 to receive the train of bit pulses representing the spatial rate of tape transport at increments of 200 pulses per inch tape. The production of this train of pulses itself is not inhibited by any of the bit density control gates 28, 29 and 32 so that gating of the pulses by gate 43 may commence at any time.

The output side of the gate 43 is connected to a counter 45 counting a predetermined number of bits before producing an output signal at its output terminal and line 46. Counting will proceed only after the end-of-record code has been detected to open gate 43. The purpose of this counter 45 is to meter the gap in between two records.

Assuming that after detection of the end-of-record code by detector 41 the tape was to be stopped, i.e., upon receiving, for example, an output signal from the end of record code detector 41, the computer may have issued a command signal into the line 23 removing the reference signal from the tape drive so as to cause the motor 15 to stop. After the deceleration period, the tape will come to a stop relative to the read-write assembly as for example illustrated in FIGURE 2C.

When the tape passed through the position relative to the read-write head assembly as shown in FIGURE 2B, the counter 45 started to count pulses, and soon the motor 15 will slow down. The rate of occurrence of pulses derived from the disk 25 through divider 4:1 will also slow down, but the number of pulses counted by the counter 45 up to the point when the tape comes to a complete stop is an exact replica of the distance the tape has travelled since the read and write heads have passed through the position shown in FIGURE 2B. This distance will be very short if the motor 15 is stopped at a very high rate of deceleration.

The particular motion characteristics of the assembly comprising motor, capstan, disk and tape from the time when the tape has a relative position to transducer heads as shown in FIGURE 2B up to the tape stop position shown in FIGURE 2C, is thereby immaterial, i.e., the counting result present in counter 45 after the tape has stopped is independent from the time it took the motor to stop the tape. The counting result represents only distance and length of tape between the end of record code on the tape, and the particular tape portion under the read head in the tape-stop position. Time does not enter into the counting result. It is, therefore, immaterial to what degree of regularity the motor approached the stop position and to what extent speed variation did occur prior to the complete stopping of motor, disk, capstan and tape.

After the tape has stopped, the counting, of course, ceases also simply for reasons of absence of any pulses to be counted, since the prime source of the bits, disk 25, has also stopped, but the counting result is stored, i.e., the counter is maintained at the particular counting state reached when the tape stopped. The same holds true for divider 31, which, as far as counting is concerned, can be regarded functionally as a part of the counter.

Now an idefinite period of time may elapse until the tape is used anew. A starting signal in command line 23 for the capstan motor 15 causes the motor-disk-capstan-tape assembly to start up again. This starting may occur at a slow rate to prevent further overloading of motor 15 which might have occured during fast deceleration. As soon as the motor starts, the very next marker on the selected track of disk 25 will produce a pulse in scanner 26 to proceed with the interrupted dividing process in stage 31, and the very next output pulse of stage 31 will be counted by counter 45, because the gate 43 is still open, flip-flop 42 was not reset. The counting is, therefore, resumed from the number stored at the time of tape stopping. The counting speed follows exactly the speed with which the motor 15 now starts up, whereby, however, the degree of regularity with which the motor, disk, capstan, and tape assembly are being started is immaterial as far as counting is concerned. The counting rate is in any instant again an exact replica of the passage of increments of tape 10 at a given point, for example, past the write head.

After the counter has reached a predetermined number, a particular signal is produced in a line 46. Since line 46 is connected to the reset input side of flip-flop 42, the flip-flop is reset by the counter output signal, and gate 43 is blocked to terminate counting. The signal in line 46 may be used also to reset the counter to zero state.

FIGURE 2D illustrates the relative position of tape 10 and read-write assembly at the instant of production of a pulse in line 46 when the counter stops. It will be observed that the tape has travelled from the time the write head wrote the end-of-record code on the tape, for a distance which is determined as follows: If X is the distance in inches between the gaps of the read and the write head, and if K is the number of pulses counted by counter 45 from beginning of counting up to the production of an output signal in line 46, which K is a fixed and known number, then the total distance the tape has travelled relative to the write head after the end-of-record code for the previous record was written, is exactly equal to $X+K/200$.

In this formula, the distance X is, of course, a constant instrument value determined solely by the space between the read and writing head, particularly the gaps thereof, while number 200 is determined by the grating of disk 25 and the 4:1 divider 31. The adjustable variable in this formula is the number K which is the number of counted pulses until a signal is produced in the line 46. It is, therefore, apparent that the gap can be made variable by controlling or adjusting the counting value K, without changing any portions of the instrumentation.

The signal in line 46 is to be used to cause another record to be written. For this purpose, the output line 46 is connected to feed back a signal into the computer for purposes of (a) informing the computer that the metered gap has been traversed and, accordingly, (b) for enabling the calling on the first character of the next record to be written onto the magnetic tape.

The output of line 46 is used additionally to set the flip-flop so as to open the gate 35. Thus, the next bit or clock pulse derived from the disk 25 and resulting in the first bit of a train of pulses in terminal 34, is used to gate open the gates 37 for writing the character passed in the meantime by the computer into the buffer 39. The same bit or clock pulse may be used to call on the computer to reload the buffer. The loading of the buffer with new characters can also be controlled by the output of gate 35, which can be connected to the computer for calling new characters.

It is a significant feature of the invention that the commencement of writing is not made dependent upon the speed attained by motor 15 at the time recording commences. The writing is permitted to start strictly after a particular gap defining portion of the tape has passed under the writing head ever since termination of writing the last record. The particular speed of the motor 15, and of the capstan and, therefore, of the tape at the time writing commences is not determined by any minimum speed for writing. Of course writing should not commence at tape speed zero, and the tape should have some motion when writing starts; that is all that is necessary. The determining factor for selecting gap length and counting number K is, therefore, how fast the tape can be stopped; the faster stopping occurs the less unused tape has passed. After restarting, writing can be resumed as soon as the tape has attained some motion. This is the reason for using fast deceleration, and if necessary for protection of the motor, slow acceleration.

The gap length is further determined by minimum speed requirements for reading. In practice, the count value K and the total length of the gap is, adjusted so that, for example, the tape has one-fourth or half of the desired normal speed at the time writing commences. It is not necessary to monitor the speed nor is any accurate value of tape speed required to start reading or writing.

A relatively early starting of writing, however, does not introduce variations in the character density on the tape. Since the disk 25 and particularly the gratings or markers thereof move also slower than normal at the time writing starts, the rate of clock pulse production is accordingly slow. Writing occurs strictly in dependence upon passage of fixed increments of tapes as determined by the respectively controlling track of disk 25, and it is, therefore, immaterial if the tape motion is a uniform one or not, nor is it critical how fast motor and capstan finally attain normal speed. The writing of the characters on the tape is position controlled by phase synchronously triggering the writing from the disk 25 having a fixed relation to the transport of the tape, and irregular tape movements are reflected in correspondingly irregular production of clock pulses at or gate 34, and the two irregular effects offset each other to such an extent that the characters still become uniformly spaced on the tape.

The inventive system is susceptible to modifications. The disk 25 may also serve as tachometer for the speed control of motor 15. Thus, for example, an intergrator can be connected to the input or output side of divider 31, which integrator provides a DC voltage which is proportional to the pulse rate frequency of the signals derived from the outer track, and this DC voltage can then be compared with the reference voltage furnished by network 22. Of course, any of the tracks can be used to provide the track output signal. The error voltage produced at terminal 20 may then serve as input for amplifier 18 as aforedescribed.

FIGURE 3 illustrates, that conversely, the DC tachometer 17 can be used as input device for monitoring the progression of the tape 10. A voltage controlled oscillator 60 is connected to tachometer 17 producing oscillations the frequency of which is proportional to the tachometer voltage which in turn is proportional to the tape speed. Over an extended speed range the phase of these oscillations are representative of the progression of the tape.

At very low tape speeds, the linearity of the tape speed versus frequency characteristics might be somewhat distorted. The resulting error in the relationship between tape progression, oscillator phase is negligible because of the tape progresses only a small distance in this range. Thus, only a small error is introduced in the gap formation.

The VCO output signal preferably is fed to a pulse former such as a Schmitt trigger 30, and the resulting pulse train is subjected to frequency division in a divider 61. The divider 61 matches the frequency output of VCO 60 to the desired bit rate.

The divider output serves as gating pulse for the counter input gate 43 as well as for the recording control gate 35 as aforedescribed. For different bit densities, the divider may be provided with taps to obtain any desired bit rate.

Another modification involves the principle of time sharing. Buffers 39 as well as counter 45 may be comprised of bistable elements such as flip flops. Buffer 39 and counter 45 never operate concurrently. Counting operation commences after writing and is terminated at the beginning of writing. Thus, one can use the same seven flip flops for either operation.

In case of buffer operation, the flip flops simply operate in parallel, having their set and reset inputs connected to signal lines such as 40 of the computer. The output of the flip flops is effective only as long as gates 37 are openable.

For counter operation, the seven flip flops are interconnected by suitable gates to form a binary counter, capable of counting up to 128. This number is amply sufficient to meter the gap, i.e., the number K introduced above will be less than 128.

In the above described embodiment, a gap on the tape was metered to equal the space between reading and writing heads, the deceleration distance and the distance of tape travelling after restarting and when having attained about half of the normal tape speed.

This total gap width can further be reduced if one considers that, for example, for reading without writing, it is required only that the tape stops fast after the reading head has monitored the end-of-record code, and that after restarting the tape must have sufficient speed so that the reading transducer heads can be energized by tape bits to a sufficient degree. The spacing between the reading and writing heads does not come into play for gap determination.

In case on resumes writing after an interruption, there is no inherent necessity that the tape starts and continues to run from the point of previous stopping. Thus, a modification of the inventive embodiment permits adaption of the gap solely to the tape start and stop characteristics. This can be carried out by modifying the circuit network of FIGURE 1 or FIGURE 3 as is shown in FIGURE 4.

The modification concerns primarily the reference voltage generator 52. After the tape has stopped and is to be restarted for writing, the computer issues a write command signal into line 23, and the network 52 connected thereto may first issue a negative reference voltage causing the tape to back up for a short period of time. The generation of such reference voltage can be implemented by a monostable circuit or the like. Subsequently, the tape is started to run in forward direction, so that, for example, half of the desired tape speed is reached and writing commences at a distance between the last end-of-record code and the writing head, which is considerably shorter than in case of tape starting forwardly directly from the stop position. The circuit modifications are as follows:

The output of reference network 52 can be used, additionally to determine the direction of counting. In particular counter 45 is now presumed to be a bidirectional counter. The counter 45 receives command signals, for forward and backward counting from network 52. This is merely a matter of bias control and is well known to one skilled in the art. For reasons of simplicity it is presumed that in case of reversal of rotation of motor 15, the forward start reference signal is not produced until motor 15 has stopped from the reverse rotation, so that at any time the polarity of the reference signal represents correctly the direction of actual rotation of the motor.

The end-of-record code here is sensed only from the write signal input (outputs of gates 37) by the detector 47. The detector 47 issues a signal when the end-of-record code is being written, and sets thereby not only flip flop 36 but also flip flop 42. Accordingly counting is started by counter 45 immediately after further recording is inhibited. After the end-of-record code has been read pursuant to the read-after-write operation the tape will be stopped. By that time, the counter will have reached a count P indicating that at the time of stopping the write head is $P/200$ inches from the end-of-record code.

This distance $P/200$ might be larger than the desired gap. Accordingly, the critical number K determining the gap length to $K/200$ inches will then be smaller than the number P, and the counter has passed through the count K state already. However, since writing is interrupted, a write command signal suitably produced in a computer command line 54 is absent causing a gate 53 to be blocked from the time of writing the end-of-record code, which is the same time when counting was started. When count K was reached by the counter 45, the corresponding output signal was prevented from resetting flip flop 42. Thus, at time of stopping of the tape and even though $P>K$, counting is not interrupted.

When now the tape is restarted for writing, the motor 15 first is reversed and the negative reference signal produced by network 52 causes (via an inverter 51) the counter 45 to count backwards, i.e., to subtract from the counting result. A flip-flop 55 is reset by the output signal of the inverter 51 causing gate 53 to be blocked even though a write command signal is then in existence. Thus, when the counter 45 by counting backwards reaches number K, again nothing will happen at the output side of gate 53.

At any time the counter position still is accurately indicative of the distance between the respective last end-of-record code on the tape from the write head measured along the tape and in increments of $1/200''$.

Depending upon the duration of the negative reference signal, motor 15 is again reversed to start forward. The time of such reversal is not critical as far as gap metering is concerned. Upon completion of such motor reversal, the operation of counter 45 is also reversed and it counts forward again; flip flop 55 is then set. Now gate 53 is prepared, and when counter 45 again reaches count K, flip-flop 42 is reset, counting is stopped, and writing can be resumed instantly, the gap being exactly $K/200''$.

This mode of operation is independent from the point whether or not $P>K$, $P<K$ or $P=K$. Also, in case there is no stopping and continued writing is desired after an end-of-record code has been written, the gap length is still the same, since in this case forward counting of counter 45 results directly after writing the end-of-record code because neither does the reference signal of generator 52 reverse its polarity nor is the write comand signal in line 54 absent. After count K has been reached for the first time, writing will be resumed, since gate 53 will produce coincidence the very first time count K has been reached.

The invention is not limited to the embodiments described above, but all changes and modifications thereof not constituting departures from the spirit and scope of the invention are intended to be covered by the following claims.

We claim:

1. In a magnetic tape recording and reproducing system, the combination:
   means including a capstan for driving a magnetic tape and being slippage-free coupled to said capstan and including means for starting and stopping the driving of the magnetic tape;
   transducer means coupled to the tape for recording thereon information;
   signal means coupled to said capstan for providing a position responsive representation of the momentary position of said capstan;
   means for monitoring said signal means and providing electrical output pulses the phase of which being representative of the position of said capstan, said pulses further representing passage of similar increments of said tape when driven by said capstan; and
   means connected for controlling the individual recording of information signals by said transducer means and pertaining to a record, on the tape as transported by said capstan in response to said output pulses;
   and means for controlling formation of a gap in between two succeeding records on the tape by inhibiting writing for a predetermined plurality of said pulses independent from occurrence of a start-stop sequence in between the writing of the two records.

2. In a magnetic tape recording system, the combination comprising:
   first means coupled to the tape for advancing the tape;
   transducer means coupled to the tape for recording information thereon;
   second means connected to the transducer means for providing thereto signals to be recorded on the tape;
   tape position sensing means providing pulses individually representative of the passage of fixed increments of tape past a given stationary point;
   first signal means connected to the second means for sequentially providing thereto recording enabling signals in response to individual ones of said pulses; and
   second signal means connected to the second means for providing thereto a disabling signal for inhibiting recording in response to a predetermined plurality of said pulses, independently from their occurrence in time for the formation of a recording gap having length of a corresponding plurality of said fixed increments.

3. In a magnetic tape recording and reproducing system, the combination comprising:
   a tape drive motor;
   transducer means coupled to the tape for writing information on the tape;
   first means for providing a data train as information to be written on the tape;
   a capstan for slippage-free driving a magnetic tape and being directly and positively coupled to said motor for said motor to drive said capstan and said tape;
   signal means coupled to said capstan for providing a voltage having amplitude representing the speed of said capstan over an extended speed range;
   means for monitoring said signal means for being responsive to the amplitude of the voltage as provided by the signal means and providing electrical output pulses the phase of which being representative of the position of said capstan and of said tape; and means connected to the first means for controlling the sequential writing of data of the train on the tape as transported by said capstan in response to said output pulses.

4. In a magnetic tape recording and reproducing system, the combination comprising:

a low inertia, high torque DC motor;

a capstan for driving a magnetic tape and being directly and positively coupled to said DC motor for said motor to drive said capstan;

first signal means including a high gain amplifier electrically coupled to said DC motor for providing an electric current thereto;

second signal means controlling said first signal means and providing an input to said first signal means in accordance with a predetermined characteristic;

third signal means coupled to said capstan for providing electrical output pulses the phase of which being representative of the position of said capstan;

transducer means coupled to the tape for writing data on the tape;

first means connected to the transducer means for providing thereto data to be written on the tape; and second means connected to the first means and to the third signal means for controlling writing of data on the tape as transported by said capstan in response to said output pulses independent from said first and second signal means.

5. In a magnetic tape recording and reproducing system, the combination:

means including a capstan for driving a magnetic tape said tape being slippage free coupled to said capstan;

signal means coupled to said capstan for providing position responsive indications of the position of said capstan;

first means for monitoring said signal means and providing electrical output pulses the phase of which being representative of the position of said capstan;

transducer means coupled to the tape for writing data on the tape;

second means connected to the transducer means for providing thereto data to be written on the tape;

third means connected to the first and second means for enabling writing respective in response to individual ones of said output pulses; and fourth means connected to the first and second means for controlling inhibition of writing of data on a tape as transported by said capstan in response to a selected plurality of said output pulses independent from the rate of production of said output pulses.

6. In a magnetic tape recording system wherein a transducer is magnetically coupled to a magnetic tape for recording of digital data on said tape, the combination comprising:

a capstan for advancing the tape;

a motor for driving said capstan and being positively coupled thereto;

means coupled to said capstan and rotating therewith and providing position representing signals when passing a stationary reference point;

signal means positioned at said reference point and being responsive to said position representing signals and providing a train of output signals phase locked to said capstan and said tape;

means for controlling the rate of digital data writing by said transducer in dependence upon occurrence of said output signals, thereby faithfully following the speed variations of said capstan within the entire range of motor speeds; and means connected to said signal means for processing said train of pulses and providing a signal representative of the passage of a predetermined length of tape relative to said transducer, for controlling the commencement of writing of data on said tape in response to occurrence of said passage representative signal.

7. In a magnetic tape recording and reproducing system, the combination comprising a low inertia high torque DC motor;

a capstan for driving a magnetic tape and being directly and positively coupled to said DC motor for said motor to drive said capstan;

means for slippage free coupling the tape to said capstan;

first signal means coupled to said capstan for providing electrical output signals representative of position and speed of said capstan and of the tape when coupled to said capstan;

second signal means connected for electrically controlling said motor in response to said speed responsive output signals in accordance with a predetermined characteristic, and independent from said position responsive output signals; and means for controlling writing of data on a tape as transported by said capstan in response to said position responsive output signals independent from said second signal means.

8. A magnetic tape recording system, comprising:

a capstan for advancing the magnetic tape;

an electric motor for driving said capstan;

electric circuit means for controlling the electric current supplied to said motor;

signal means including transducing means for writing a digital record on said tape upon transport of said tape by said capstan;

controlled oscillating means operatively coupled to said capstan for providing oscillations representative of the passage of fixed increments of said tape past said transducing means;

and second means responsive to said signals for enabling said signal means to commence writing after said tape has passed through a predetermined number of said increments, and to clock the writing of a digital record on said tape in response to said signals independent from said electric circuit means.

9. In a magnetic tape recording system wherein a transducer is magnetically coupled to a magnetic tape for recording of digital data on said tape, the combination comprising:

a capstan for slippage free advancing the tape;

a motor for driving said capstan and being positively coupled thereto;

means coupled to said capstan and rotating therewith and providing representation of the speed of said capstan and of a tape when coupled to said capstan, over an extended range;

first signal means responsive to said representation and deriving therefrom a train of output signals substantially phase locked to said capstan and said tape over said extended range;

means for controlling the rate of digital data writing by said transducer in dependence upon occurrence of said output signals, thereby faithfully following the speed variations of said capstan within the entire range of motor speeds; and means for controlling said motor in response to said speed representation.

10. In a magnetic tape recording and reproducing system, the combination comprising a low inertia, high torque motor;

a capstan for driving a magnetic tape and being directly and positively coupled to said motor for said motor to drive said capstan;

first signal means coupled to said capstan for providing a position and speed responsive representation of the momentary position and speed of said capstan;

second signal means operatively coupled to said first signal means and providing electrical output signals representative of position and speed of said capstan;

third signal means connected to electrically control said motor in response to said speed responsive output signals and in accordance with characteristics for faster deceleration than acceleration;

transducer means coupled to the tape for writing data on the tape;

first means connected to the transducer means for providing thereto data to be written on the tape; and second means connected to the first means and to the second signal means for controlling the writing of data by the transducer means on the tape as transported by said capstan in response to said position responsive output signals and independent from said third signal means.

References Cited

UNITED STATES PATENTS

| | | | |
|---|---|---|---|
| 2,854,526 | 9/1958 | Morgan | 340—174.1 |
| 2,879,126 | 3/1959 | James | 340—174.1 |
| 2,994,857 | 8/1961 | Giel | 340—174.1 |
| 3,088,101 | 4/1963 | Schrimpf | 340—174.1 |
| 3,196,421 | 7/1965 | Grace et al. | 340—174.1 |

BERNARD KONICK, *Primary Examiner.*

V. P. CANNEY, *Assistant Examiner.*